L. WESTBROOK.
Churn.
No. 23,968.
Patented May 10, 1859.
FIG. 1.
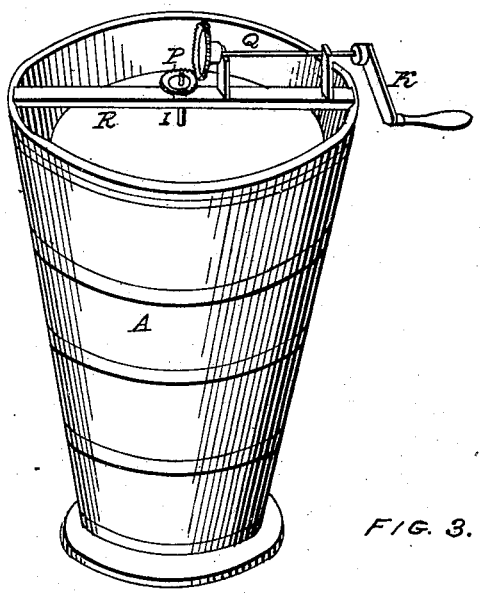
FIG. 2.
FIG. 3.
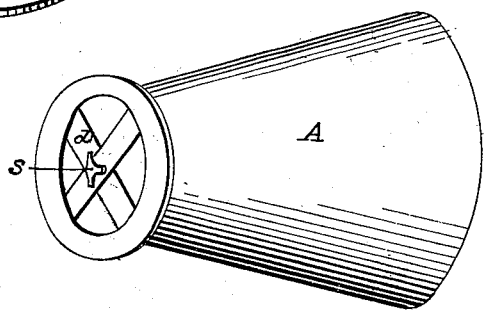
FIG. 4.
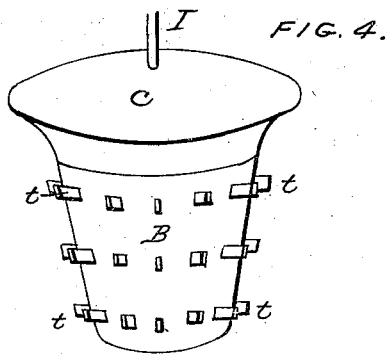
WITNESSES:
INVENTOR.

UNITED STATES PATENT OFFICE.

LEONARDO WESTBROOK, OF NEW YORK, N. Y.

CHURN.

Specification of Letters Patent No. 23,968, dated May 10, 1859.

*To all whom it may concern:*

Be it known that I, LEONARDO WESTBROOK, of the city, county, and State of New York, have invented a new and Improved Churn; and I declare the following to be a true and exact description of the same, reference being had to the accompanying drawings and to the letters of reference marked thereon.

To enable others skilled in the art to make and use my invention, I proceed to describe its construction and operation.

In the diagrams the same letters refer to like parts.

Figure 1 is an upright view of the apparatus complete and ready for operation. Fig. 2, is a view of the outer case, exhibiting the arrangement of the stationary dashers attached to the inside of the same. Fig. 3, is intended to show the arrangement of the bottom of the case. Fig. 4, shows the construction of the inner cylinder, or revolving dasher shaft, with the radial dashers attached to the same.

The outer case A, (Fig. 2), I make in the form of an inverted truncated cone, open at the bottom except where crossed by two bars $d$, $d'$ (Fig. 3) through the intersection of which passes a thumb screw $s$, (Fig. 3) on which the revolving dasher shaft is to rest, and which can thus raise or lower the same.

Near the top, and on the inside of the outer case A, and above the fixed dashers $d$, I make a projecting rim X X X, (Fig. 2) from a half to three quarters of an inch wide. This does not protrude squarely from the side of the case, but is rounded or oval. On or over this rim, when the parts are put together comes the disk C, (Figs. 1 and 4) attached to, and forming part of the revolving dasher shaft. It is obvious that by working the thumb-screw $s$, (Fig. 3.) the disk C, will be raised or lowered, so as to leave, approach or rest upon, the projecting rim X X X.

The fixed dashers $o$, $o$, $o$, (Fig. 2) are merely slats or bars attached to the sides of the case and projecting toward its center. Alternating with these, when the apparatus is in operation pass the revolving dashers, $t$, $t$, $t$, (Fig. 4) attached to the inner shaft B, (Fig. 4).

The revolving dasher-shaft or cylinder B (Fig. 4) I construct with a small indentation in the center of the bottom, to rest over, and revolve on, the end of the thumb screw $s$, (Fig. 3). A smaller central spindle I, (Figs. 1 and 4) also protrudes through the top plate or disk C, and passing through a hole in the cross beam R, R, (Fig. 1) freely revolves in and is held steady by the same. On the upper end of this is a pinion P, (Fig. 1) which is turned by another pinion $P^1$ on a crank shaft Q, worked by the crank K, as shown in Fig. 1.

It is obvious that the revolving shaft B, instead of being also in the shape of an inverted cone, as shown in the Fig. 4, nearly fitting the inside of the outer case, may, below the disk C, be a mere (and much smaller) cylindrical spindle, with radial dashers attached to the same.

To operate my churn, I place the same over a tub, pail or other suitable vessel; I then pour into the space above the disk C, the milk or cream to be churned, simultaneously turning the crank K. The disk C, being slightly in contact with the rim X X X, as it revolves, rubs the milk or cream as it passes through, producing in it some change, mechanical or otherwise, but not having friction enough to melt the butter contained in it. The milk or cream in this modified form, then falling among the numerous dashers is thoroughly churned, before it passes out into the receiving vessel at the bottom.

I do not claim separately the use of friction, compression, or other mechanical violence in the making of butter, nor do I claim the separate use of horizontally revolving dashers, alternating with fixed ones or otherwise. But What I do claim as my invention and desire to secure by Letters Patent is, The use of the projecting rim X X X, and the revolving disk C, working over the same, in combination with the fixed and revolving radial dashers, and with or without the regulating thumb screw $s$, all constructed and operating substantially as described and for the purposes herein set forth.

LEONARDO WESTBROOK.

Witnesses:
WM. H. BALLANTYNE,
J. T. MINOR.